(12) United States Patent
Chen et al.

(10) Patent No.: US 6,902,119 B2
(45) Date of Patent: Jun. 7, 2005

(54) INJECTION MOLDING DISTRIBUTION MANIFOLD HAVING IMPROVED UNIFORMITY OF MANIFOLD BLOCK TEMPERATURES

(75) Inventors: Jincheng Chen, Lee's Summit, MO (US); Brian R. Lefebure, Lee's Summit, MO (US)

(73) Assignee: R&D Tool & Engineering Co., Lee's Summit, MO (US)

( * ) Notice: Subject to any disclaimer, the term of this patent is extended or adjusted under 35 U.S.C. 154(b) by 104 days.

(21) Appl. No.: 10/336,168

(22) Filed: Jan. 3, 2003

(65) Prior Publication Data

US 2004/0140370 A1 Jul. 22, 2004

(51) Int. Cl.[7] .................................................. B05C 1/00
(52) U.S. Cl. ......................................... 239/135; 239/450
(58) Field of Search .......................... 239/75, 132, 133, 239/134, 135, 450

(56) References Cited

U.S. PATENT DOCUMENTS

| | | | |
|---|---|---|---|
| 2,182,389 A | 12/1939 | Reid | |
| 3,348,520 A | * 10/1967 | Lockwood | ................... 118/667 |
| 4,225,109 A | 9/1980 | Yotsutsuji et al. | |
| 4,276,015 A | 6/1981 | Rogers | |
| 4,390,485 A | 6/1983 | Yang | |
| 4,717,521 A | 1/1988 | Border et al. | |
| 4,717,522 A | 1/1988 | Evely | |
| 4,922,082 A | 5/1990 | Bredt et al. | |
| 4,964,795 A | * 10/1990 | Tooman | ...................... 425/144 |
| 5,503,545 A | * 4/1996 | Benenati | ...................... 425/190 |
| 5,569,474 A | 10/1996 | Kitaichi et al. | |
| 5,705,793 A | 1/1998 | Kitaichi et al. | |
| 5,973,296 A | 10/1999 | Juliano et al. | |
| 6,037,574 A | 3/2000 | Lanham et al. | |
| 6,222,166 B1 | 4/2001 | Lin et al. | |
| 6,410,894 B1 | 6/2002 | Hoffmann et al. | |

* cited by examiner

Primary Examiner—Christopher Kim
(74) Attorney, Agent, or Firm—Hovey Williams LLP

(57) ABSTRACT

Auxiliary end heating devices on an elongated, heated hot melt distribution manifold body assist in maintaining uniform temperatures throughout all portions and passageways of the manifold body. The heating devices preferably take the form of thick film electrical resistive heaters of plate-like construction. The end heaters are on their own control circuit separate and apart from the circuit for other heaters for remaining portions of the manifold body. Special isolating slots are formed in lower corners of the manifold body between supporting standoffs and overhead melt passageways in the manifold body.

16 Claims, 2 Drawing Sheets

INJECTION MOLDING DISTRIBUTION MANIFOLD HAVING IMPROVED UNIFORMITY OF MANIFOLD BLOCK TEMPERATURES

TECHNICAL FIELD

This invention relates to injection molding manifolds and, more particularly, to ways of managing heat distribution throughout the manifold in an effort to achieve uniform temperatures of all melt channels or passages, even those near the ends of the manifold.

BACKGROUND AND SUMMARY

Elongated manifold blocks typically have a central inlet passage that delivers hot melt from an extruder or other source into the center of the block and then splits it into a main runner that delivers the melt to a series of injection nozzles spaced along the length of the manifold body. While various means are typically utilized to keep the body hot so that the melt flows properly at all times, the opposite ends of the manifold are typically exposed to ambient air. Consequently, passages associated with the endmost nozzles are difficult to maintain at the same high temperatures as other passages in the body. Moreover, structures utilized to support the manifold often function as heat sinks to draw off disproportionate amounts of heat in end portions of the body and compound the problem.

The present invention addresses this problem by providing a way of supplying auxiliary heat specifically to opposite end portions of the manifold body in addition to that which is supplied to the body as a whole. Furthermore, the temperature in at least one of the end portions is sensed separately from the rest of the body to control the auxiliary supply of heat separately from the main supply, with a view to establishing a uniform temperature throughout the entire body if at all possible.

In a preferred form of the invention, each auxiliary source of heat is a generally flat electrical resistance type heater applied to each end surface of the manifold body. Preferably, the heater covers the entire exposed surface of the end of the body. In addition, in order to reduce the amount of heat drawn off by supports at the corners of the body, a pair of isolating slots extend transversely through the entire body and are located generally between each support and the melt passages in the upper and inboard regions of the body. In a preferred form, each isolating slot is generally L-shaped, having a vertical leg that is shorter than the horizontal leg and with the horizontal leg extending inwardly toward the center of the body from the bottom of the vertical leg.

DETAILED DESCRIPTION

Figure 1:
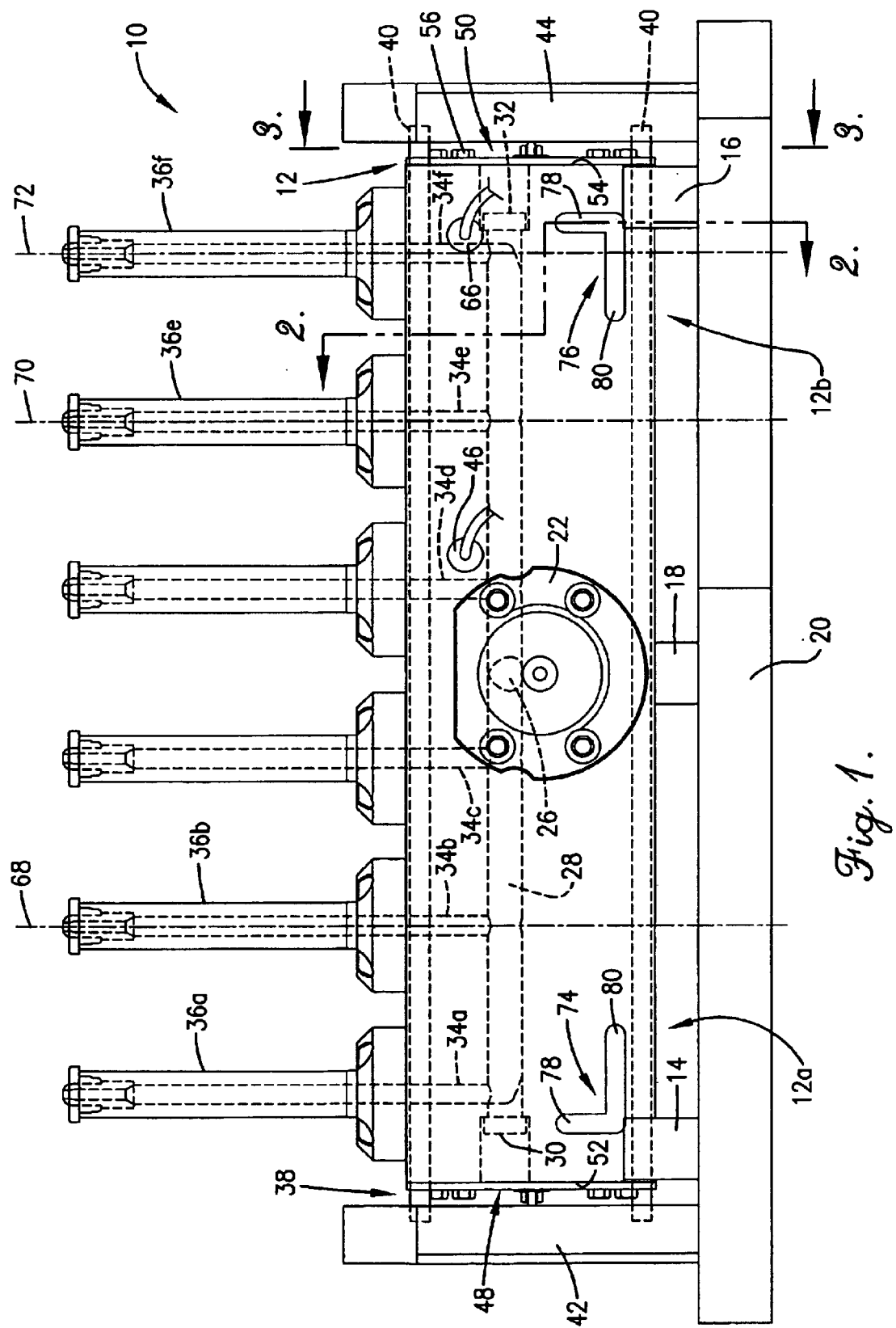
FIG. 1 is a front elevational view of a distribution manifold assembly for an injection molding machine constructed in accordance with the principles of the present invention.
Figure 2:
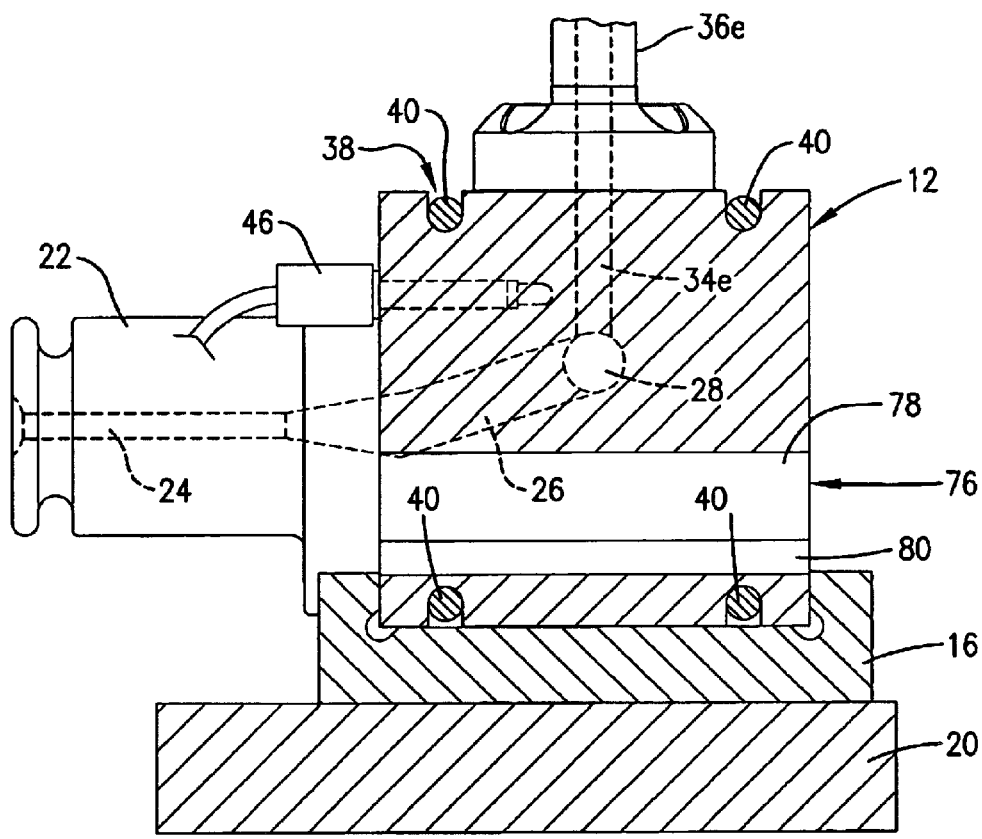
FIG. 2 is a slightly enlarged, fragmentary cross-sectional view thereof taken substantially along line 2—2 of FIG. 1.

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

The distribution manifold assembly 10 includes an elongated parallelepiped metallic manifold body 12 preferably constructed from 4140 alloy steel. Body 12 is supported by a pair of end supports or standoffs 14 and 16 and by a center support 18, all of which are preferably constructed from a low thermal conductivity material such as 304 stainless steel. Underlying the supports 14, 16 and 18 is a horizontal support plate 20 that is preferably constructed of a high carbon alloy steel.

Secured to the front face of body 12 is a sprue bushing 22 that is adapted to be connected to the outlet of an extruder or other source of hot melt for the purpose of supplying such molten plastic material to manifold assembly 10. Sprue bushing 22 has a through passage 24 that delivers melt to an upwardly inclined inlet passage 26 in body 12. Inlet passage 26, in turn, intersects with a main, longitudinally extending runner passage 28 that extends essentially the full length of body 12 in opposite directions from central inlet passage 26. Main runner 28 is capped at its opposite ends by a pair of plugs 30 and 32. A series of branch passages 34 intersect with main runner 28 along the length thereof and lead to corresponding injection nozzles 36. Preferably, nozzles 36 may take the form of the nozzles disclosed and claimed in co-pending application Ser. No. 10/272,974, filed Oct. 16, 2002 in the name of Brian R. Lefebure titled "Injection Molding Nozzle." Said application is hereby incorporated by reference into the present specification.

Manifold body 12 is provided with heating mechanism broadly denoted by the numeral 38 for keeping body 12 at a high enough temperature that plastic material within the various internal passages of body 12 remains molten at all times. In part such heating mechanism 38 takes the form of four electrical resistance type heating rods or elements 40 that extend along the length of body 12 and are situated at each of the four corners thereof as viewed from the end or in transverse cross-section. Elements 40 may, for example, take the form of rods available from Watlow Electric Manufacturing Company of St. Louis, Mo. and are secured in place in a well-known manner. Opposite ends of elements 40 project outwardly beyond manifold body 12 and into corresponding upright receivers 42 and 44 wherein elements 40 are electrically connected with various circuitry and the like. A sensor in the nature of a thermocouple 46 received within body 12 generally near the mid-portion thereof above main runner 28 is connected in the same electrical circuit as heating elements 40 for the purpose of controlling operation of elements 40. Thermocouple 46 is operable to sense when the temperature within the surrounding region of manifold body 12 drops to a predetermined level so as to cause heating elements 40 to be activated as necessary to maintain the predetermined temperature. Although a wide variety of sensors may be utilized for carrying out this function, one acceptable sensor is a standard thermocouple available from Watlow Electric Manufacturing Company of St. Louis, Mo.

In conventional manifold assemblies the branch passages associated with the endmost nozzles present the biggest challenge for maintaining the desired heat level because in conventional manifold assemblies opposite ends of the manifold body are exposed to ambient air. For the sake of illustration, the branch passages of manifold body 12 have been labeled 34a through 34f with the two endmost branches being branches 34a and 34f. If manifold body 12 were a conventional body, branches 34a and 34f would be the branches most subject to heat loss.

Figure 3:
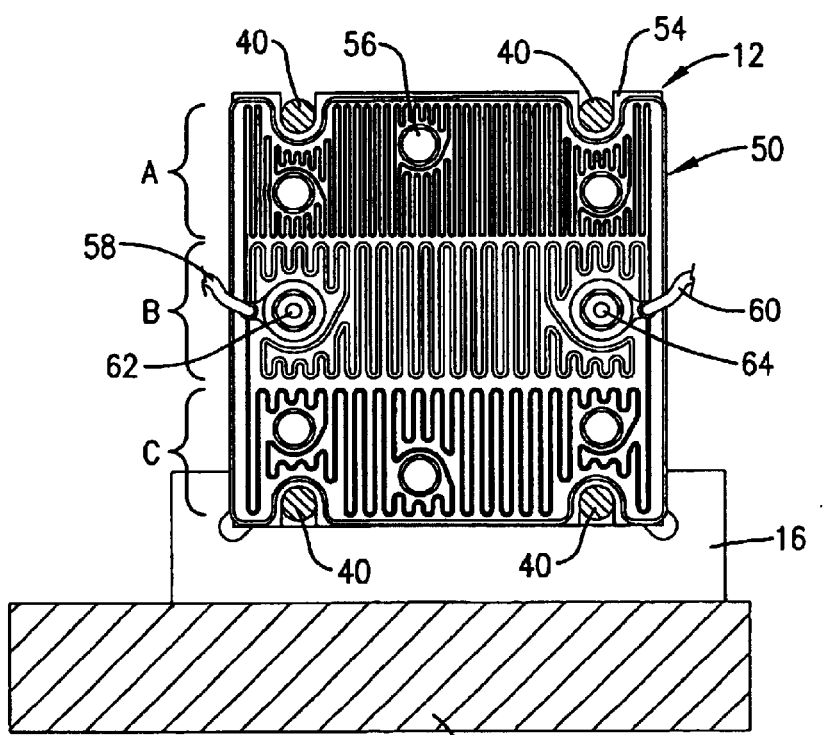
FIG. 3 is a slightly enlarged fragmentary cross-sectional view thereof taken substantially along line 3—3 of FIG. 1.

However, in accordance with the present invention, heating mechanism 38 includes a pair of auxiliary end heating devices 48 and 50 applied to opposite ends of body 12 for the purpose of maintaining branches 34a and 34f, as well as their adjacent portions of main runner 28, at substantially the same temperature level as all other passages within body 12. In a preferred embodiment, each end heating device 48, 50 takes the form of a generally flat electrical resistance type heater such as that available from Watlow Electric Manufacturing Company of St. Louis, Mo. as a thick film heater having a 300 or 400 series stainless steel substrate. Preferably, each heating device 48,50 is attached to the flat, corresponding end surface 52 or 54 of body 12 by suitable fasteners such as screws 56. As illustrated in FIG. 3, each end heating device 48, 50 overlies and covers virtually the entire surface area of the corresponding end surface 52 or 54. Preferably, as illustrated with respect to heating device 50 in FIG. 3, each heating device 48, 50 is designed to produce three different levels or zones of heat output from the top to the bottom of the device, namely zones A, B and C. Zone A in the top one-third of the device produces the lowest heat output, while zone B in the middle one-third produces the highest output. Zone C in the lower third produces an intermediate range of heat output.

Each heating device 48, 50 has a pair of leads 58 and 60 connected to corresponding terminals 62 and 64 that connect electrically with heating elements of the devices. Leads 58 and 60 are connected in an electrical circuit that is separate and apart from that for heating elements 40 and sensor 46 so that devices 48 and 50 are not controlled by sensor 46. Instead, devices 48 and 50 are controlled by a separate sensor 66 that is preferably the same type of thermocouple as sensor 46. In a preferred embodiment, only one of such sensors 66 is utilized to control both devices 48, 50.

In a preferred form of the invention the sensor 66 is located in an end portion of manifold body 12 so as to be in the most advantageous position for detecting temperature variations in that critical region of the body. For purposes of the present invention, an end portion of body 12 is defined as that portion of the body that extends from the center line of the next-to-the-last branch passage in the body to the corresponding end surface of the body. Thus, in the present embodiment, manifold body 12 has two end portions 12a and 12b. End portion 12a extends from the center line 68 of inboard nozzle 36b and branch passage 34b outwardly to end surface 52, and end portion 12b extends from center line 70 of inboard nozzle 36e and branch passage 34e outwardly to end surface 54. In the illustrated embodiment, the sensor 66 is located in end portion 12b, preferably slightly outboard of the central axis 72 of endmost nozzle 36f and endmost branch passage 34f.

To further control and manage heat distribution and loss within manifold body 12, each end portion 12a and 12b is provided with its own isolating slot 74 or 76 that passes entirely transversely through body 12 generally between the corresponding standoff 14 or 16 and the overhead melt passageways 28 and 34. Each slot is generally L-shaped, having a relatively short vertical leg 78 and a longer horizontal leg 80. Horizontal leg 80 intersects vertical leg 78 at the lower end of leg 78, while vertical leg 78 intersects horizontal leg 80 at the outer end of horizontal leg 80. Vertical leg 78 is entirely disposed outboard of the axis 72 associated with endmost nozzle 36f and endmost branch passageway 34f. Horizontal leg 80 is spaced a short distance above the lower two heating elements 40 of manifold body 12.

Operation

Operation and use of manifold assembly 10 should be apparent from the foregoing description. With the auxiliary end heaters 48 and 50 in place, the end branch passages 34a and 34f are no longer exposed to heat loss to the degree suffered by prior art manifolds. Instead, end portions 12a and 12b of manifold body 12 can be maintained at substantially the same temperature level as the remaining portion of the manifold body with the result that much better melt flow characteristics can be obtained. Moreover, by having end heating devices 48, 50 under the control of their own sensor 66, rather than relying upon the sensor 46 used for the central region of the manifold body, precise temperature control can be obtained exactly where heat loss is most likely to occur.

The isolating slots 74 and 76 immediately above each of the standoffs 14, 16 serve as a way of breaking the drain of heat that otherwise occurs from the passageways in end regions of the body due to the standoffs 14, 16 acting as heat sinks. Slots 74,76 perform their function without significantly weakening the structural integrity of the manifold body in these areas.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

What is claimed is:

1. A distribution manifold for molten plastic material comprising:

an elongated metallic body having a pair of opposite ends presenting exterior end surfaces, said body further having a series of injection nozzles spaced alone the length of the body, and passages within the body for supplying molten plastic material to the nozzles; and heating mechanism for the body including a pair of end heating devices attached to said exterior end surfaces in heat exchange relationship with said opposite ends of the body, said series of nozzles including an outboard nozzle at each end of the body and an inboard nozzle beside each outboard nozzle, said nozzles each having a discharge passage with a central axis, said manifold body having a pair of opposite end portions extending from the central axis of the passages of the inboard nozzles outwardly to the corresponding ends of the body, further comprising a pair of supports engaging the bottom of the manifold body in heat transfer relationship therewith, one of said supports being located in each end portion of the body, further comprising an isolating slot extending transversely through the body in each end portion thereof above the corresponding support.

2. A distribution manifold as claimed in claim 1, each of said slots being generally L-shaped, presenting a horizontal leg and a vertical leg.

3. A distribution manifold as claimed in claim 2, said horizontal leg intersecting the vertical leg at the lower end of the vertical leg.

4. A distribution manifold as claimed in claim 3,
said vertical leg intersecting the horizontal leg at the outer end of the horizontal leg.

5. A distribution manifold as claimed in claim 1,
further comprising a support plate spaced below said manifold body and supporting said pair of supports.

6. A distribution manifold as claimed in claim 1,
said heating mechanism further including a plurality of elongated heating elements extending along the length of the body,
further comprising a first sensor responsive to temperature in a central portion of the manifold body inboard of said end portions and operably connected with said heating elements for controlling operation of said heating elements,
further comprising a second sensor responsive to temperature in a said end portion of the manifold body and operably connected with said end heating devices for controlling operation of said end heating devices.

7. A distribution manifold as claimed in claim 6,
each of said end heating devices comprising a generally flat electrical resistance type heater.

8. A distribution manifold as claimed in claim 7,
each of said ends surface being flat,
each of said heaters substantially covering said surface.

9. A distribution manifold assembly for molten plastic material comprising:
an elongated metallic body having a pair of opposite ends, a series of injection nozzles spaced along the length of the body, and passages within the body for supplying molten plastic material to the nozzles;
heating mechanism in heat transfer relationship with the body,
said series of nozzles including an endmost nozzle at each end of the body and an inboard nozzle beside each endmost nozzle,
said nozzles each having a discharge passage with a central axis,
said manifold body having a pair of opposite end portions extending from the central axis of the passages of the inboard nozzles outwardly to the proximal ends of the body; and
a pair of supports engaging the bottom of the manifold body in heat transfer relationship therewith,
one of said supports being located in each end portion of the body,
said body having a pair of isolating slots extending transversely through the body in each end portion thereof above the corresponding support.

10. A distribution manifold assembly as claimed in claim 9,
further comprising a support plate spaced below said manifold body and supporting said pair of supports.

11. A distribution manifold assembly as claimed in claim 9,
each of said slots being generally L-shaped, presenting a horizontal leg and a vertical leg.

12. A distribution manifold assembly as claimed in claim 11,
said horizontal leg intersecting the vertical leg at the lower end of the vertical leg.

13. A distribution manifold assembly as claimed in claim 12,
said vertical leg intersecting the horizontal leg at the outer end of the horizontal leg.

14. A distribution manifold assembly as claimed in claim 9,
said heating mechanism including a pair of end heating devices in heat transfer relationship with said opposite ends of the body.

15. A distribution manifold assembly as claimed in claim 14,
each of said end heating devices comprising a generally flat electrical resistance type heater.

16. A distribution manifold assembly as claimed in claim 15,
said heating mechanism further including a plurality of elongated heating elements extending along the length of the body,
further comprising a first sensor responsive to temperature in a central portion of the manifold body between said end portions and operably connected with said heating elements for controlling operation of said heating elements,
further comprising a second sensor responsive to temperature in a said end portion of the manifold body and operably connected with said end heating devices for controlling operation of said end heating devices.

* * * * *